United States Patent
Najmolhoda et al.

(10) Patent No.: US 8,186,317 B2
(45) Date of Patent: *May 29, 2012

(54) HYDRAULIC FLUID PASSAGE WITH PARTICLE GETTERING MAGNET FIELD OF THE INVENTION

(75) Inventors: Hamid Najmolhoda, Grand Rapids, MI (US); David Seid, Conklin, MI (US)

(73) Assignee: Saturn Electronics & Engineering, Inc., Auburn Hills, MI (US)

( * ) Notice: Subject to any disclaimer, the term of this patent is extended or adjusted under 35 U.S.C. 154(b) by 84 days.

This patent is subject to a terminal disclaimer.

(21) Appl. No.: 12/653,869

(22) Filed: Dec. 21, 2009

(65) Prior Publication Data

US 2010/0095917 A1    Apr. 22, 2010

Related U.S. Application Data

(63) Continuation of application No. 11/298,308, filed on Dec. 9, 2005, now Pat. No. 7,673,597.

(51) Int. Cl.
*F01L 9/02* (2006.01)

(52) U.S. Cl. ............... 123/90.12; 123/90.11; 123/90.13; 137/544; 251/129.15

(58) Field of Classification Search ............... 123/90.12, 123/90.11, 90.13; 251/129.01, 129.15; 137/493, 137/544

See application file for complete search history.

(56) References Cited

U.S. PATENT DOCUMENTS

| | | | |
|---|---|---|---|
| 5,611,370 A | 3/1997 | Najmolhoda | 137/625.61 |
| 5,984,259 A | 11/1999 | Najmolhoda et al. | 251/50 |
| 5,996,628 A | 12/1999 | Najmolhoda et al. | 137/625.61 |
| 6,179,268 B1 | 1/2001 | Seid | 251/65 |
| 6,209,563 B1 | 4/2001 | Seid et al. | 137/15.21 |
| 6,321,767 B1 | 11/2001 | Seid et al. | 137/15.21 |
| 6,337,012 B1 | 1/2002 | Devine | 210/223 |
| 6,581,634 B2 | 6/2003 | Najmolhoda et al. | 137/545 |
| 7,673,597 B2 * | 3/2010 | Najmolhoda et al. | 123/90.12 |
| 2002/0189575 A1 | 12/2002 | Rayl et al. | 123/198 F |

FOREIGN PATENT DOCUMENTS

| | | |
|---|---|---|
| DE | 101 53 247 A | 5/2003 |
| GB | 861 078 | 2/1961 |
| WO | WO 97/09275 | 3/1997 |

* cited by examiner

*Primary Examiner* — Ching Chang

(57) ABSTRACT

Combination of a housing having a fluid passage and one or more solenoid actuated fluid control valves communicated to the fluid passage wherein a permanent magnet is disposed in fluid passage upstream of the fluid control valves to magnetically capture or getter ferrous particles in fluid prior to entry into the fluid control valve.

32 Claims, 2 Drawing Sheets

HYDRAULIC FLUID PASSAGE WITH PARTICLE GETTERING MAGNET FIELD OF THE INVENTION

This application is a continuation of U.S. application Ser. No. 11/298,308 filed on Dec. 9, 2005 now U.S. Pat. No. 7,673,597.

FIELD OF THE INVENTION

The present invention relates to a hydraulic fluid passage communicated to a solenoid actuated fluid control valve and, more particularly, to a particle gettering magnet disposed in the fluid passage.

BACKGROUND OF THE INVENTION

Internal combustion engines for motor vehicles are known which include a hydraulic system for performing work in addition to lubrication. This work can be used to activate/deactivate cylinders of an internal combustion engine to conserve fuel. Such a hydraulic valve lifter activation/deactivation system can include a hydraulic control valve in a valve housing mechanically connected to a separate solenoid. The solenoid includes a solenoid coil bobbin on which a wire coil is wound and an armature that moves the control valve in response to an input signal (coil electrical current signal) to the wire coil to control hydraulic pressure in the valve lifter oil control gallery. A separate check valve assembly is mounted in a fluid exhaust passage (vent-to-sump) in the engine block or cylinder head and functions to maintain oil pressure in the oil control gallery at a preselected minimum value. Such engine oil control solenoids comprise numerous components which must be assembled together and are known to suffer from hydraulic fluid (oil) leakage through various paths around the solenoid housing.

U.S. Pat. Nos. 6,209,563 and 6,321,767 and 6,581,634 describe engine oil solenoid actuated control valves for controlling a valve lifter activation/deactivation system of a vehicle internal combustion engine. Such engine oil solenoid actuated control valves are communicated to the valve lifter oil control gallery (i.e. receive supply pressure) such that ferrous (paramagnetic) particles in the engine oil supply may migrate or pass through the supply port filters of the solenoid actuated control valve to the solenoid where they can adversely affect performance and life of the control valves.

U.S. Pat. No. 6,581,634 describes an engine oil solenoid actuated control valve for controlling a valve lifter activation/deactivation system of a vehicle internal combustion engine wherein a particle gettering magnet is disposed on the solenoid actuated control valve to magnetically attract and hold ferrous particles in hydraulic fluid supplied to the supply port of the solenoid control valve.

Electronic transmissions for certain motor vehicles are known which include a plurality of hydraulic spool valves each controlled by a respective proportional variable force solenoid actuated control valve of the type described in U.S. Pat. Nos. 5,611,370; 5,996,628; 5,984,259 and 6,179,268. The proportional variable force solenoid control valves regulate hydraulic pressure on the spool valve in response to an electrical signals from an electronic transmission controller to smooth shifting of the transmission at particular shifting points. Such transmission solenoid control valves are communicated to a transmission module fluid supply circuit such that ferrous (paramagnetic) particles in the transmission hydraulic fluid may migrate or pass through the supply port filters of the solenoid actuated control valves to the solenoid where they can adversely affect performance and life of the control valves.

SUMMARY OF THE INVENTION

The present invention provides a combination of a housing having a fluid passage and one or more solenoid actuated fluid control valves communicated to the fluid passage wherein a permanent magnet is disposed in the fluid passage upstream of the one or more fluid control valves in a manner to magnetically capture or getter ferrous particles in the fluid prior to entry into the one or more fluid control valves.

An illustrative embodiment of the invention involves a fluid supply passage of a hydraulic valve lifter activation/deactivation system of an internal combustion engine and one or more engine oil solenoid actuated fluid control valves wherein the permanent magnet is disposed in the fluid supply passage upstream of the one or more fluid control valves.

Another illustrative embodiment of the invention involves a fluid supply passage of a manifold or module of a vehicle transmission fluid supply circuit and one or more solenoid actuated fluid control valves wherein the permanent magnet is disposed in the fluid supply passage upstream of the one or more fluid control valves.

The permanent magnet can comprise any suitable permanent magnet shape and magnet material to magnetically attract and hold ferrous particles in the hydraulic fluid before the particles can enter the one or more supply ports.

The foregoing and other advantages of the invention will become apparent from the following more detailed description taken with the accompanying following drawings.

DESCRIPTION OF THE INVENTION

The present invention can be practiced with respect to control of a hydraulic valve lifter activation/deactivation system to activate/deactivate engine cylinders, to control one or more spool valves of an electronic transmission of a motor vehicle, or to control any other engine or vehicle transmission hydraulic fluid system. The invention is not limited to these hydraulic fluid applications and can be practiced to control an engine or transmission cooling system using a cooling fluid as well as to control any other fluid system having a solenoid actuated fluid control valve.

For purposes of illustration only and not limitation, the present invention will be described herebelow first with respect to an engine oil solenoid actuated fluid control valve of the type described in U.S. Pat. No. 6,321,767, the teachings of which are incorporated herein by reference, for use with a hydraulic valve lifter activation/deactivation system to activate/deactivate engine cylinders.

Figure 1:
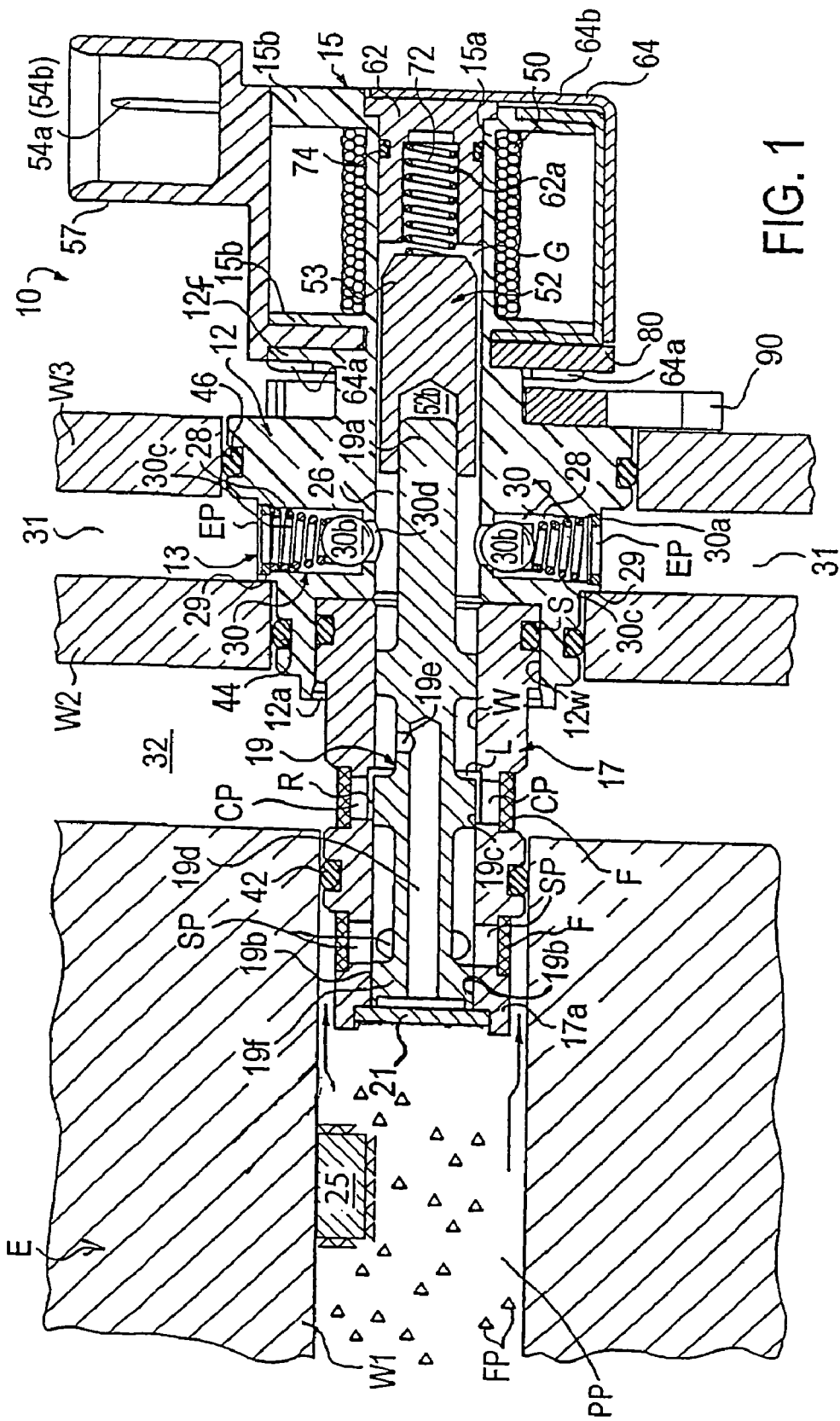
FIG. 1 is a longitudinal sectional view of a hydraulic fluid supply passage of a hydraulic valve lifter activation/deactivation system of an internal combustion engine and an engine oil solenoid actuated fluid control valve communicated to the fluid supply passage wherein a permanent magnet is disposed in the fluid supply passage upstream of the valve supply port(s) pursuant to an embodiment of the invention.

Referring to FIG. 1, an engine oil solenoid control valve 10 pursuant to an illustrative embodiment of the invention is shown including a molded one-piece check valve nozzle and bobbin member 12 forming a check valve-receiving region 13 and a coil bobbin region 15. The member 12 can be injection or otherwise molded of a moldable thermoplastic material, such as the high temperature rated, glass fiber reinforced thermoplastic material (e.g. A model A1133HS material available from Amoco Polymers, Inc.), or other suitable moldable material.

The molded one-piece member 12 includes an open end 12a proximate the check valve-receiving region 13 that receives a tubular fluid port-forming and spool-receiving metal (e.g. aluminum) sleeve member 17 that provides a plurality of supply ports SP and control ports CP on the sleeve member 17. A fluid seal S is provided between the sleeve member 17 and the inner wall 12w of the open end 12a. The outermost end of the sleeve member 17 is sealed closed by a brass (or other material) plug or plate 21 that also acts a spool stop. A spool valve 19 is received in a cylindrical axial bore of port-forming sleeve member 17 and includes a spool valve end 19a connected to a solenoid armature 52. The spool valve 19 moves in response to movement of the solenoid armature 52 in response to electrical current signals supplied to the solenoid coil 50. The spool valve 19 includes first and second cylindrical sealing surfaces or lands 19b, 19c that are moved relative to the respective fluid supply ports SP and control ports CP to control fluid flow at the control ports. The spool valve 19 may include additional lands (not shown) to prevent binding of the spool valve 19 in the axial bore of sleeve member 17. Annular fluid filters F can be provided in annular grooves on the sleeve member 17 for the supply ports SP and control ports CP. The control ports CP are communicated to one another by an annular recessed control port chamber or region R extending circumferentially about the inner wall W of the sleeve member 17 and relative to which the spool land 19c moves to open or close the control port chamber or region R as described below.

The supply ports SP are communicated to a source of hydraulic fluid pressure, such as a main engine oil pressure supply passage PP in an internal combustion engine block or cylinder head E. In particular, the end 17a of the sleeve member 17 is received in the passage PP so that the supply ports SP receive hydraulic oil via the passage PP. An O-ring seal 42 is disposed on the end of the sleeve member 17 to seal on wall W1.

Pursuant to an embodiment of the invention, a permanent magnet 25 is disposed in the hydraulic fluid supply passage PP provided in the internal combustion engine block or cylinder head E upstream of the solenoid actuated engine oil control valve 10. For example, in FIG. 1, a permanent magnet 25 is disposed on the wall W1 of the passage PP of the engine block or cylinder head E at a location upstream of the supply port(s) SP of the control valve 10 so that the permanent magnet can magnetically attract and hold or getter ferrous particles in the hydraulic fluid before the particles can enter the fluid control valve. The magnet 25 optionally can disposed in a recess in the wall W1, suspended away from the wall W1' in a manner to reside in the supply passage PP to contact the fluid, or the magnet 25 can be formed as a cylindrical magnet that is received in the supply passage PP or even forms a portion of the length of the supply passage PP to contact the fluid. One or more permanent magnets 25 can be disposed in passage PP to this end as needed.

The permanent magnet 25 can comprise any suitable permanent magnet shape and magnet material to magnetically attract and hold ferrous particles in the hydraulic fluid before the particles can enter the one or more supply ports SP. For example, the permanent magnet can have an elongated bar shape, ring or cylindrical shape concentric with passage PP, cylindrical flat (disc) shape, or other shapes. The surface area of the permanent magnet 25 exposed to the hydraulic fluid in the passage PP is empirically selected based on the given volume of fluid flowing through the passage over a given time to protect the fluid control valve from adverse effects of ferrous particles FP in the hydraulic fluid. The location of the magnet 25 relative to the solenoid actuated engine oil fluid control valve likewise can be determined empirically for any given supply passage PP and location of the control valve 10 to this end.

The permanent magnet 25 can be fastened on the passage wall W1 of the engine block or cylinder head E by magnetic attraction if the wall W1 of the engine block or cylinder head E comprises a ferrous material such as cast iron or steel, epoxy adhesive, heat staking, press fit, crimping, mechanical fasteners, and other suitable fastening technique depending upon the material from which the passage wall W1 is made. For example, when the passage wall W1 is made of high performance thermoplastic, the permanent magnet 25 can be heat staked to the wall W1 by resistance welding, infrared staking, or forming with hot tooling.

The permanent magnet 25 can comprise any suitable permanent magnet material such as, for example, preferably a rare earth element-bearing permanent magnet material such as $Nd_2Fe_{14}B$ magnet material, or other suitable magnet material.

The permanent magnet 25 functions to magnetically attract and trap, hold or capture certain ferrous particles FP present in the hydraulic fluid, removing the particles from the fluid, before the particles can be carried to annular filter F disposed on end 17a at the supply ports SP through which they might migrate to the solenoid air gap G where they can adversely affect performance and life of the control valve by restricting the stroke of spool valve 19. The permanent magnet 25 typically is provided to attract and capture ferrous particles in a size range of about 5 to 75 microns for a major particle dimension to remove them from the hydraulic fluid, while the filter F at supply ports SP is designed to trap or capture to this same end larger ferrous particles in the size range of greater than 75 microns for a major particle dimension. The ferrous particles typically originate from wear or abrasion of ferrous (e.g. iron or iron alloy) engine components, or transmission materials in the case of a transmission hydraulic fluid system.

The control ports CP are communicated to a control passage 32 that supplies hydraulic fluid to an oil control gallery (not shown) of a hydraulic valve lifter activation/deactivation circuit provided in the engine block or engine cylinder head E.

A longitudinal armature bore or passage 26 is defined in part in the region 13 and communicates to a pair of diametrically opposed check valves 30 residing in a respective receptacle 28 formed in intermediate diameter bosses 29 on one-piece member 12. Each receptacle 28 defines an exhaust port EP. Passage 26 communicates to the axial bore of sleeve member 17. Each check valve 30 includes an annular cap 30a held in the receptacle 28 by heat staking or ultrasonic welding and a ball check valve 30b made of steel (e.g. type 440C steel) and located between a biasing spring 30c and ball valve seat 30d. Ball valve seat 30d can be formed integral to member 12 by molding or comprise a separate insert in the nozzle region.

Each check valve 30 communicates to an exhaust passage 31 of the hydraulic valve lifter activation/deactivation circuit. The check valves 30 are provided at the respective exhaust port EP to prevent oil pressure in the oil control gallery (not shown) of the hydraulic valve lifter activation/deactivation circuit from falling below a preselected minimum oil pressure value such as, for example only 3 psi, when the hydraulic valve lifter activation/deactivation system is deactivated.

The spool valve 19 includes a longitudinal bore or passage 19d that communicates at one end to a radial bore 19e that in turn communicates to the axial bore of sleeve member 17 and armature bore 26. At the other opposite end 19f of the spool valve, the passage 19d communicates to any hydraulic fluid that leaks from the supply port SP past land 19b so as to fluid pressure balance the spool valve 19.

The region 13 and sleeve member 17 include respective first and second O-ring seals 44, 42 that are disposed in a circumferential groove molded integrally in the member 12 and a circumferential groove formed in sleeve member 17. Seals 44, 42 mate with walls W2, W1 of fluid control passage 32 of a hydraulic valve lifter activation/deactivation circuit provided in the engine block or engine cylinder head E with the control passage 32 supplying hydraulic fluid to the oil control gallery. A third O-ring seal 46 is provided in a circumferential groove molded integrally on larger diameter region 13 of member 12 and together with O-ring 44 mate with walls W3, W2 of fluid exhaust passage 31 of a hydraulic valve lifter activation/deactivation circuit provided in the engine block or engine cylinder head with fluid exhaust passage 31 providing for return of hydraulic fluid to a low pressure sump. As mentioned above, check valves 30 are provided at the exhaust ports EP to prevent oil pressure in the oil control gallery of the hydraulic valve lifter activation/deactivation circuit from falling below a preselected minimum oil pressure value such as, for example only, 3 psi, when the valve lifter activation/deactivation system is deactivated.

In particular, at the closed spool valve position of FIG. 1, the control land 19c does not completely close off the region R of control ports CP such that there is a preselected underlap (gap) L of the land 19c at region R of control ports CP (e.g. 0.003 inch gap) controlled by bias of armature spring 72 and effective to provide a 3 psi hydraulic pressure at control ports CP and at check valve 30 in armature bore 26 in the closed spool valve position when the valve lifter activation/deactivation system is deactivated. The underlap L communicates the control ports CP and armature bore 26 to supply port SP enough to provide the 3 psi fluid (oil) pressure at control ports CP and check valves 30. The underlap L is controlled by bias of armature spring 72. As an example of the 3 psi underlap, if there is 20 psi hydraulic pressure at the supply port SP, a 3 psi hydraulic pressure can be provided by underlap L at the control ports CP and check valves 30, which opens, as necessary, to allow fluid flow through exhaust ports EP to maintain 3 psi in the oil control gallery that is communicated to control ports CP. The check valves 30 thus open against bias of respective springs 30c as necessary to maintain a 3 psi (or other) oil pressure at the control ports and the oil control gallery when the valve lifter activation/deactivation system is deactivated.

The coil bobbin region 15 includes an electromagnetic wire coil 50 (partially shown) wound on bobbin sleeve 15a along the length thereof between annular bobbin end walls 15b. The coil 50 is connected to a source of input signals, such as an engine electronic control (EEC) module (not shown), that provides electrical current signals to the coil 50 to control movement of an armature 52 that, in turn, controls the position of a spool valve 19 between the closed/open valve positions (on/off) to control hydraulic pressure in the valve lifter oil control gallery. The solenoid coil 50 receives the current signals via electrical connectors 54a, 54b that reside in a molded connector housing 57 disposed on member 12 and that are connected to the coil. The connectors 54a, 54b are connected to the signal source (EEC module).

The spool valve 19 is moved between the valve closed position, FIG. 1, and a valve open position in response to electrical current signals supplied to solenoid coil 50 from the EEC module (not shown). The spool valve 19 is moved to the open position to activate the hydraulic valve lifter activation/deactivation system (not shown) and to the valve closed position to deactivate the hydraulic valve lifter activation/deactivation system as described in U.S. Pat. No. 6,321,767 of common assignee herewith, the teachings of which are incorporated herein by reference.

A simple generally cylindrical armature rod 53 can be used as the armature 52 in an embodiment of the present invention that further includes molded integral arcuate recesses (not shown) in bore 26. Such arcuate recesses extend radially into the armature bore 26 on diametrically opposite sides of the bore 26 and along the axis of bore 26 to provide axial paths for hydraulic fluid on opposite lateral ends of the armature 52 to eliminate any imbalanced hydraulic pressures acting thereon (hydraulic lock condition where the armature would remain in open or closed positions) as shown and described in U.S. Pat. Nos. 6,209,563 and 6,321,767 of common assignee herewith, the teachings of which are incorporated herein by reference. The armature rod 53 typically is made of ferrous material such as steel. A simple, low cost armature rod 53 can be used without the need for a complex geometry armature.

The armature 52 includes an axial end bore 52b in which the end 19a of the spool valve 19 is pressed in interference fit to a preselected axial dimension dictated by the depth of bore 52b. This controlled dimension of the spool valve end in the armature bore 52b permits close control of the axial gap G provided between ferromagnetic armature 52 and a ferromagnetic (e.g. steel) pole piece 62 without the need for a calibration of the axial gap. The pole piece 62 is disposed in an end bore of the coil bobbin region 15 by radially compressive forces of O-ring 74 disposed on the pole piece.

A fast response, high flow rate control valve is provided by preselected gap G provided between the end of the armature 52 and pole piece 62 in the bobbin region 15 together with annular circumferentially recessed control port chamber or region R. The preselected gap G in turn defines a spool valve open position relative to the control port chamber or region R where, at the open valve position, a flow area is provided to control ports CP equal to the circumference of the annular recessed control port chamber or region R multiplied times the gap axial distance by which the spool land 19c opens at the control port chamber or region R as a result of the armature end closing the gap G when the appropriate electrical current signals are supplied to the solenoid coil 50 as described in U.S. Pat. No. 6,321,767, the teachings of which are incorporated herein by reference.

The solenoid can or housing 64 typically is made of steel or other magnetically permeable material and includes an axial end flange 64b to axially retain the pole piece 62. The solenoid housing 64 is joined to the member 12 by circumferential or radial tabs 64a crimped to overlie a partial annular flange 12f of the one-piece member 12 and the steel flux washer 80.

Steel flux washer 80 is disposed on the member 12 in a position to concentrate magnetic flux at the armature 52 residing in the armature bore 26. The washer 80 extends about approximately 85% of the periphery of the armature 52.

The pole piece 62 is provided with a controlled axial dimension blind bore 62a that receives the end of the spring 72 to avoid the need to calibrate the spring preload using a set screw.

The engine oil solenoid control valve having the ferrous particle-trapping permanent magnet 25 on the sleeve member 17 pursuant to the invention can be used to control oil pressure in the oil control gallery of an internal combustion engine as part of a hydraulic valve lifter activation/deactivation system. A mounting bracket 90 is provided to mount the solenoid control valve on the engine block to this end. The invention is not limited to practice with the engine oil solenoid control valve described in detail above and can be practiced with the engine oil solenoid control valve described in U.S. Pat. No. 6,209,563 having a ball valve, rather than a spool valve, and already incorporated herein by reference as well as other types of engine oil solenoid control valves.

Figure 2:
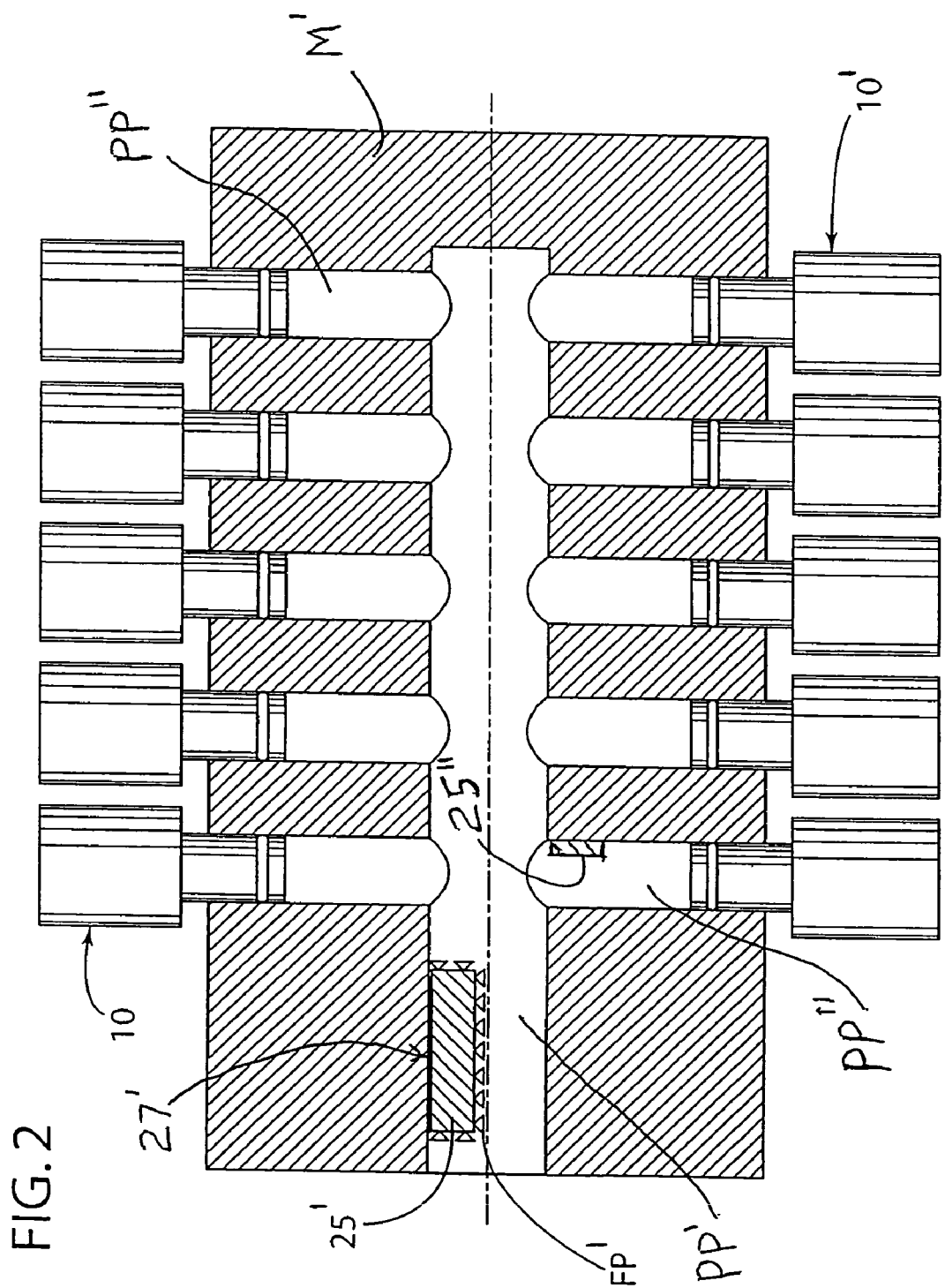
FIG. 2 is a schematic sectional view of a fluid manifold having a main fluid supply passage and a plurality of laterally extending secondary fluid supply passages for supplying fluid to a respective solenoid actuated fluid control valve communicated to a respective secondary fluid supply passage wherein a permanent magnet is disposed in the main fluid supply passage upstream of the secondary fluid supply passages and the fluid control valves communicated thereto pursuant to another embodiment of the invention.

FIG. 2 schematically illustrates another embodiment of the invention wherein a fluid manifold M' is shown having a main hydraulic fluid supply passage PP' and a plurality of laterally extending secondary fluid supply passages PP''' for supplying fluid to a respective solenoid actuated fluid control valve 10' communicated to a respective secondary fluid supply passage PP'''. For purposes of illustration and not limitation, the fluid manifold M' can comprise a hydraulic fluid transmission manifold or module of a vehicle transmission hydraulic fluid system or circuit. A permanent magnet 25' is disposed in the main fluid supply passage PP' upstream of the secondary fluid supply passages PP''' and the fluid control valves 10' communicated thereto to magnetically attract and trap, hold or capture certain ferrous particles PP'' present in the hydraulic fluid, thereby removing the particles from the fluid before the particles can be carried to the solenoid actuated fluid control valves 10'. The magnet 25' is shown attached by epoxy adhesive layer 27' between the magnet 25' and the passage wall, but the magnet 25' optionally can be held in the main fluid supply passage PP' by magnetic attraction if the wall of the passage PP' comprises a ferrous material such as cast iron or steel, by heat staking, by press fit, by crimping, by mechanical fasteners, and other suitable fastening technique depending upon the material from which the passage wall W1 is made.

The secondary fluid supply passages PP''' also optionally can have a permanent magnet 25'' (shown in one passage PP''' for convenience) disposed therein to magnetically attract and trap, hold or capture certain size ferrous particles PP'' still present in the hydraulic fluid in passage PP''', thereby removing the particles from the fluid before the particles can be carried to the solenoid actuated fluid control valves 10'.

For purposes of further illustration and not limitation, the present invention can be practiced with a proportional variable force solenoid actuated valve of the general type described in U.S. Pat. No. 5,984,259, the teachings of which is incorporated herein by reference, used to control a spool valve of an electronic transmission of a motor vehicle. For example, such a proportional variable force solenoid actuated valve can be substituted for a respective one of the valves 10' of FIG. 2.

Although certain preferred embodiments of the invention have been shown and described in detail, it should be understood that variations or modifications may be made without departing from the spirit or scope of the present invention.

We claim:

1. A combination of a fluid passage in an engine block or cylinder head and one or more solenoid actuated control valves communicated to the fluid passage wherein a magnet resides in the fluid passage separate and upstream of the one or more solenoid actuated fluid control valves and yet leaves an adjacent portion of the fluid passage open for fluid flow to the one or more solenoid actuated fluid control valves such that the magnet magnetically captures or getters ferrous particles in fluid in the fluid passage prior to entry into the one or more solenoid actuated fluid control valves.

2. The combination of claim 1 wherein the fluid passage conducts pressurized hydraulic fluid.

3. The combination of claim 1 wherein said magnet is disposed upstream of a respective supply port of said one or more solenoid actuated fluid control valves.

4. The combination of claim 1 wherein said magnet comprises a rare earth-bearing permanent magnet.

5. The combination of claim 1 wherein said magnet is attached on a fluid passage-forming wall of the engine block or cylinder head.

6. The combination of claim 5 wherein said magnet is attached by magnetic attraction to the wall.

7. The combination of claim 1 wherein said magnet is disposed on a fluid passage-forming wall of the engine block or cylinder head.

8. The combination of claim 1 wherein said magnet is suspended from a fluid passage-forming wall of an engine block or cylinder head.

9. A combination of a fluid supply passage of a hydraulic valve lifter activation/deactivation system of an internal combustion engine and one or more engine oil solenoid actuated fluid control valves communicated to the fluid supply passage wherein a magnet resides in the fluid supply passage separate and upstream of the one or more engine oil solenoid actuated fluid control valves and yet leaves an adjacent portion of the fluid passage open for fluid flow to the one or more engine oil solenoid actuated fluid control valves such that the magnet magnetically captures or getters ferrous particles in fluid in the fluid supply passage prior to entry into the one or more engine oil solenoid actuated fluid control valves.

10. The combination of claim 9 wherein the fluid passage conducts pressurized hydraulic fluid.

11. The combination of claim 9 wherein said magnet is disposed upstream of a respective supply port of said one or more engine oil solenoid actuated fluid control valves.

12. The combination of claim 9 wherein said magnet comprises a rare earth-bearing permanent magnet.

13. The combination of claim 9 wherein said magnet is attached on a fluid passage-forming wall of an engine block or cylinder head.

14. The combination of claim 13 wherein said magnet is attached by magnetic attraction to the wall.

15. The combination of claim 9 wherein said magnet is disposed on a fluid passage-forming wall of an engine block or cylinder head.

16. The combination of claim 9 wherein said magnet is suspended from a fluid passage-forming wall of an engine block or cylinder head.

17. A combination of a fluid supply manifold or module and one or more solenoid actuated fluid control valves disposed on the manifold or module so as to communicate to a fluid supply passage therein wherein a magnet resides in the fluid supply passage of the manifold or module separate and upstream of the one or more solenoid actuated fluid control valves and yet leaves an adjacent portion of the fluid supply passage open for fluid flow to the one or more solenoid actuated fluid control valves such that the magnet magnetically captures or getters ferrous particles in fluid in the fluid supply passage prior to entry into the one or more solenoid actuated fluid control valves.

18. The combination of claim 17 wherein the fluid passage conducts pressurized hydraulic fluid.

19. The combination of claim 17 wherein said magnet is disposed in a main fluid supply passage of the manifold or module upstream of one or more secondary fluid supply passages communicated to the main fluid supply passage.

20. The combination of claim 19 further including another magnet disposed in each secondary fluid supply passage separate and upstream of a respective solenoid actuated fluid control valve communicated to that respective secondary fluid supply passage.

21. The combination of claim 17 wherein said magnet comprises a rare earth-bearing permanent magnet.

22. The combination of claim 17 wherein said magnet is attached on a fluid passage-forming wall of the manifold or module.

23. The combination of claim 22 wherein said magnet is attached by magnetic attraction to the wall.

24. The combination of claim 17 wherein said magnet is disposed on a fluid passage-forming wall of the manifold or module.

25. The combination of claim 17 wherein said magnet is suspended from a fluid passage-forming wall of the manifold or module.

26. In conveying a fluid through a fluid passage of a housing communicated to one or more solenoid actuated fluid control valves, the improvement comprising providing a magnet in the fluid passage separate and upstream of the one or more solenoid actuated fluid control valves while leaving an adjacent portion of the fluid passage open for fluid flow to the one or more solenoid actuated fluid control valves so that the magnet magnetically captures or getters ferrous particles in fluid in the fluid passage prior to entry into the one or more solenoid actuated fluid control valves.

27. The method of claim 26 including flowing the fluid from an internal combustion engine passage to a respective supply port of the one or more solenoid actuated fluid control valves.

28. The method of claim 26 including flowing the fluid from a respective control port of the one or more solenoid actuated fluid control valves to a hydraulic valve lifter activation/deactivation system of an internal combustion engine.

29. The method of claim 26 including flowing the fluid from a supply passage of a fluid manifold or module to a respective supply port of the one or more solenoid actuated fluid control valves.

30. The method of claim 29 wherein the fluid manifold or module is communicated to a transmission hydraulic system.

31. The method of claim 26 including attaching or suspending the magnet on a fluid passage-forming wall of the housing.

32. The method of claim 31 including attaching the magnet by magnetic attraction to the wall.

* * * * *

UNITED STATES PATENT AND TRADEMARK OFFICE
CERTIFICATE OF CORRECTION

| | |
|---|---|
| PATENT NO. | : 8,186,317 B2 |
| APPLICATION NO. | : 12/653869 |
| DATED | : May 29, 2012 |
| INVENTOR(S) | : Hamid Najmolhoda et al. |

It is certified that error appears in the above-identified patent and that said Letters Patent is hereby corrected as shown below:

Title page and Col. 1 (Title)

Replace [54] Title: with --HYDRAULIC FLUID PASSAGE WITH PARTICLE GETTERING MAGNET--

Signed and Sealed this
Tenth Day of July, 2012

David J. Kappos
*Director of the United States Patent and Trademark Office*